(12) United States Patent
Shimogawa

(10) Patent No.: US 10,445,198 B2
(45) Date of Patent: Oct. 15, 2019

(54) INFORMATION PROCESSING DEVICE THAT MONITORS A PLURALITY OF SERVERS AND FAILOVER TIME MEASUREMENT METHOD

(71) Applicant: FUJITSU LIMITED, Kawasaki-shi, Kanagawa (JP)

(72) Inventor: Kenichirou Shimogawa, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 123 days.

(21) Appl. No.: 15/797,629

(22) Filed: Oct. 30, 2017

(65) Prior Publication Data

US 2018/0181473 A1 Jun. 28, 2018

(30) Foreign Application Priority Data

Dec. 27, 2016 (JP) .................. 2016-253544

(51) Int. Cl.
| | | |
|---|---|---|
| *G06F 11/00* | (2006.01) | |
| *G06F 11/20* | (2006.01) | |
| *G06F 11/36* | (2006.01) | |
| *G06F 11/22* | (2006.01) | |
| *G06F 11/07* | (2006.01) | |

(52) U.S. Cl.
CPC ........ *G06F 11/2023* (2013.01); *G06F 11/008* (2013.01); *G06F 11/0793* (2013.01); *G06F 11/2215* (2013.01); *G06F 11/3688* (2013.01); *G06F 2201/85* (2013.01)

(58) Field of Classification Search
CPC ............... G06F 11/2215; G06F 11/008; G06F 11/3688; G06F 11/1448; G06F 11/2089
See application file for complete search history.

(56) References Cited

U.S. PATENT DOCUMENTS

| | | | | |
|---|---|---|---|---|
| 2002/0172158 A1* | 11/2002 | Hoefelmeyer | ...... | H04L 12/4604 370/241 |
| 2009/0228748 A1* | 9/2009 | Hagerott | ............. | G06F 11/2215 714/718 |
| 2013/0346803 A1* | 12/2013 | Chiruvolu | ........... | G06F 11/3688 714/37 |
| 2014/0298082 A1* | 10/2014 | Rikitake | ............. | G06F 11/2215 714/4.11 |
| 2015/0149835 A1* | 5/2015 | Jayaraman | .......... | G06F 11/0751 714/48 |
| 2015/0277956 A1 | 10/2015 | Uchikawa et al. | | |
| 2016/0080267 A1 | 3/2016 | Okada | | |

FOREIGN PATENT DOCUMENTS

| | | |
|---|---|---|
| JP | 2012-198843 | 10/2012 |
| JP | 2015-194958 | 11/2015 |
| JP | 2016-58005 | 4/2016 |
| WO | WO 2016/075771 A1 | 5/2016 |

* cited by examiner

Primary Examiner — Charles Ehne
(74) Attorney, Agent, or Firm — Staas & Halsey LLP

(57) ABSTRACT

An information processing includes a processor and monitors a plurality of operational servers to which processing is allocated. The processor determines an operational server on which failover will be performed in a failover test from among the plurality of operational servers in accordance with a number of the plurality of operational servers and a load, when a condition under which the failover test is conducted is satisfied, and issues a request to measure a failover time of the failover test that is conducted on the determined operational server.

5 Claims, 16 Drawing Sheets

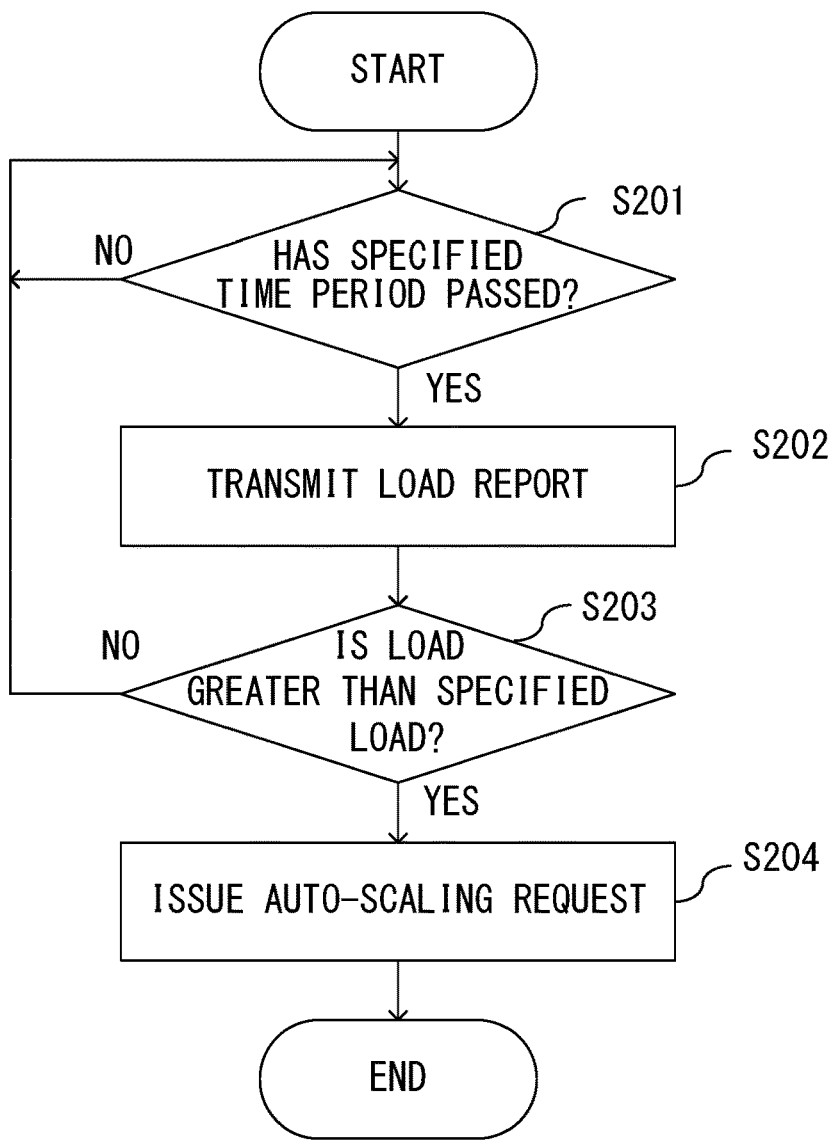
F I G. 2

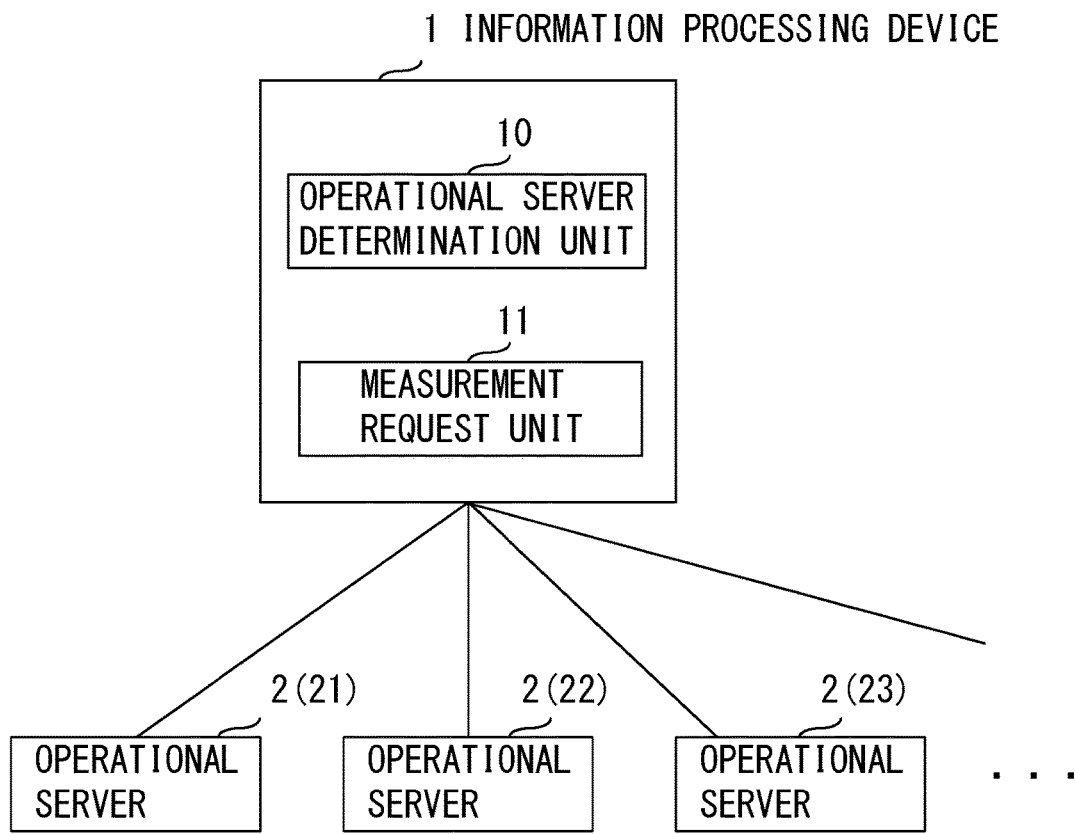
F I G. 3 A

| OPERATIONAL SERVER NAME | LOAD VALUE | AUTO-SCALING REPORT | AUTO-SCALING REQUEST ACCEPTANCE TIME |
|---|---|---|---|
| SERVER 1 | 70 (%) | OFF | 0 |
| SERVER 2 | 83 (%) | ON | 12:10:00 |
| SERVER 3 | 75 (%) | OFF | 0 |

F I G. 4

F I G. 5

| FAILOVER TEST START TIME | FAILOVER TEST END TIME | CURRENT NUMBER OF OPERATIONAL SERVERS | NUMBER OF PREVIOUS-FAILOVER-TEST CONDUCTED SERVERS |
|---|---|---|---|
| 11:00:00 | 11:10:20 | 3 | 1 |

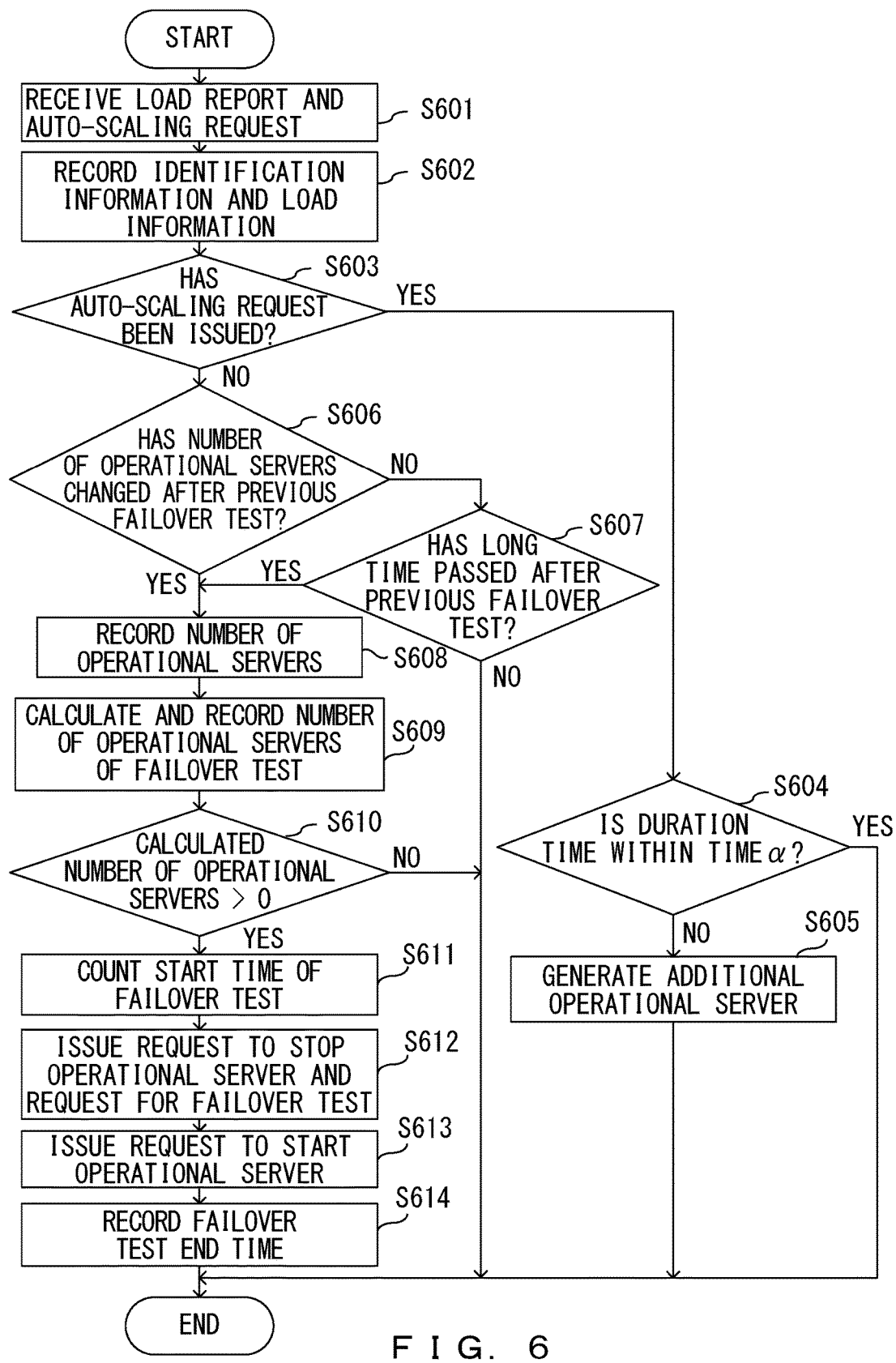
F I G. 6

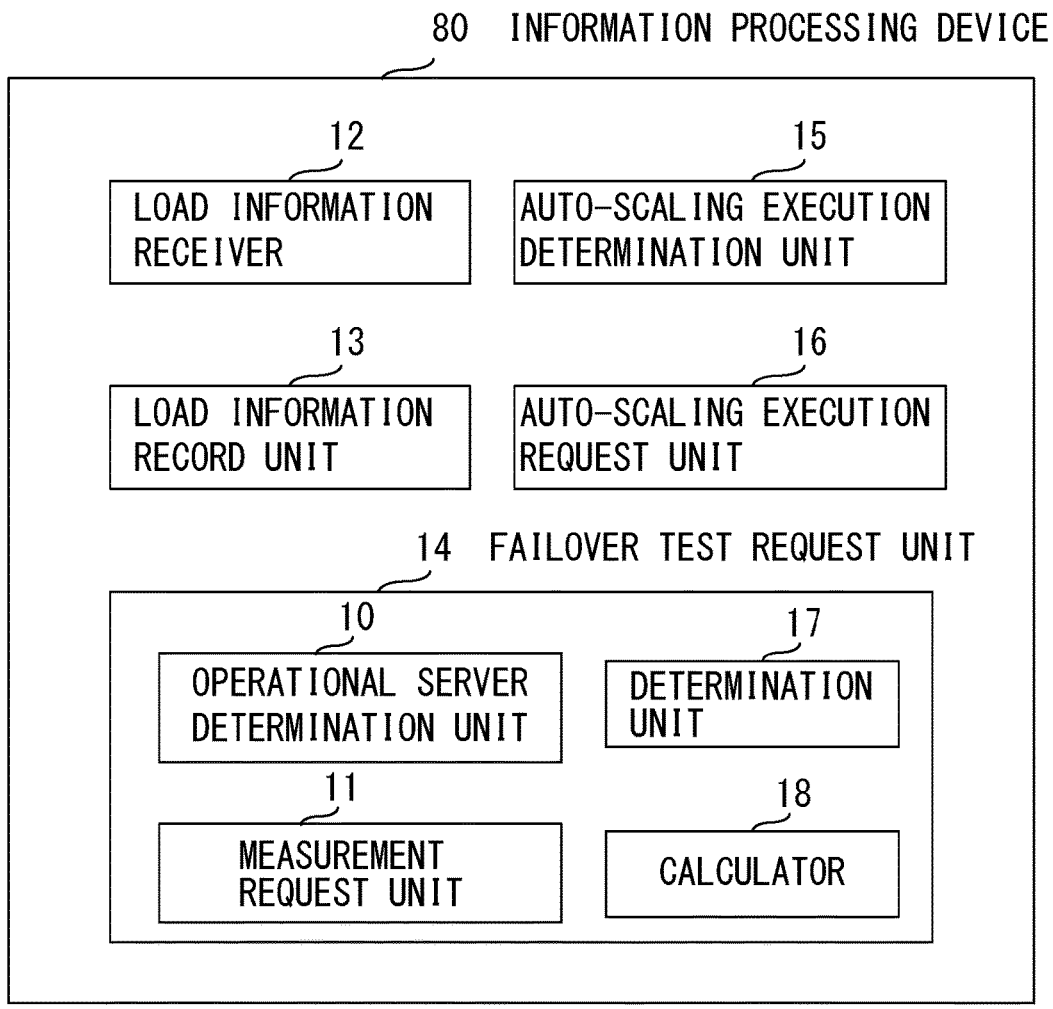
F I G. 8

| FAILOVER TEST START TIME | FAILOVER TEST END TIME | CURRENT NUMBER OF OPERATIONAL SERVERS | NUMBER OF PREVIOUS -FAILOVER-TEST CONDUCTED SERVERS | FAILOVER TIME PER VM |
|---|---|---|---|---|
| 11:00:00 | 11:10:00 | 3 | 1 | 10:00 |
| 12:00:00 | 12:16:00 | 4 | 2 | 8:00 |
| 13:00:00 | 13:21:00 | 6 | 3 | 7:00 |
| 14:00:00 | 14:25:00 | 8 | 5 | 5:00 |

FIG. 9

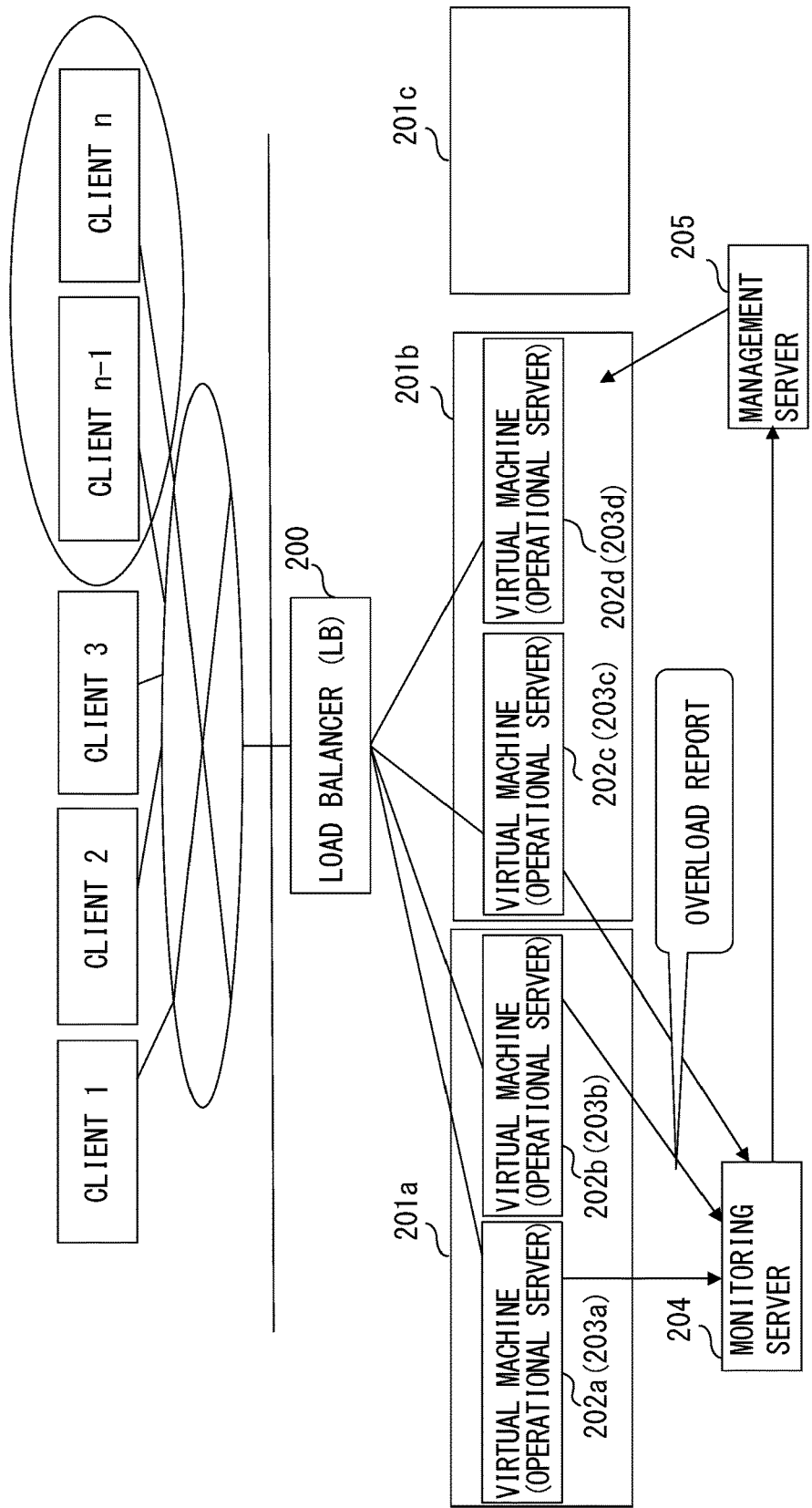
F I G. 12

INFORMATION PROCESSING DEVICE THAT MONITORS A PLURALITY OF SERVERS AND FAILOVER TIME MEASUREMENT METHOD

CROSS-REFERENCE TO RELATED APPLICATION

This application is based upon and claims the benefit of priority of the prior Japanese Patent Application No. 2016-253544, filed on Dec. 27, 2016, the entire contents of which are incorporated herein by reference.

FIELD

The embodiments discussed herein are related to an information processing device that monitors a plurality of servers and a failover time measurement method.

BACKGROUND

An auto-scaling technology exists in which, in an operational model for distributing a load by using a load balancer (LB), when a load on each operational server increases, an operational server that is an operation distribution destination is automatically added.

In addition, an automatic failover technology exists in which, in an operational model for distributing a load by using a load balancer, when an operational server goes down, the operational server that has gone down is restarted in another VM host.

Further, a processing distribution system exists in which the above respective technologies are combined. In this case, auto-scaling and automatic failover may be simultaneously performed (for example, Japanese Laid-open Patent Publication No. 2016-58005).

Note that related technologies are described, for example, in Japanese Laid-open Patent Publication No. 2015-194958, Japanese Laid-open Patent Publication No. 2012-198843, Japanese Laid-open Patent Publication No. 2016-058005 and International Publication Pamphlet No. WO2016/075771.

In the case of an operational model to which the respective technologies are simultaneously applied, an operational server fails to recognize the state of another operational server, and therefore the operational server fails to determine whether an increase in a load results from an increase in the volume of operations or the failure of another operational server. The operational server issues an overload report when a load increases, and therefore the operational server only activates auto-scaling.

In contrast, a management server can recognize the failure of an operational server, and therefore the management server can activate automatic failover. However, the management server is not directly involved in the operation of the operational server, and therefore the management server fails to recognize that the operational server has activated auto-scaling.

SUMMARY

According to an aspect of the present invention, an information processing device includes a processor and monitors a plurality of operational servers to which processing is allocated. The processor determines an operational server on which failover will be performed in a failover test from among the plurality of operational servers in accordance with a number of the plurality of operational servers and a load, when a condition under which the failover test is conducted is satisfied, and issues a request to measure a failover time of the failover test that is conducted on the determined operational server.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a flowchart illustrating processing for transmitting a load report and an auto-scaling request in an operational server.

FIGS. 3A and 3B are functional block diagrams of an information processing device according to a first embodiment.

FIG. 4 illustrates an example of an operational server load information table.

FIG. 5 illustrates an example of a failover test information table.

FIG. 6 is a flowchart illustrating processing including a failover test request of an information processing device according to each of the embodiments.

FIG. 8 is a functional block diagram of an information processing device according to a second embodiment.

FIG. 9 illustrates an example of an extended failover test information table.

FIG. 12 is a diagram explaining the auto-scaling technology.

DESCRIPTION OF EMBODIMENTS

Figure 1A:
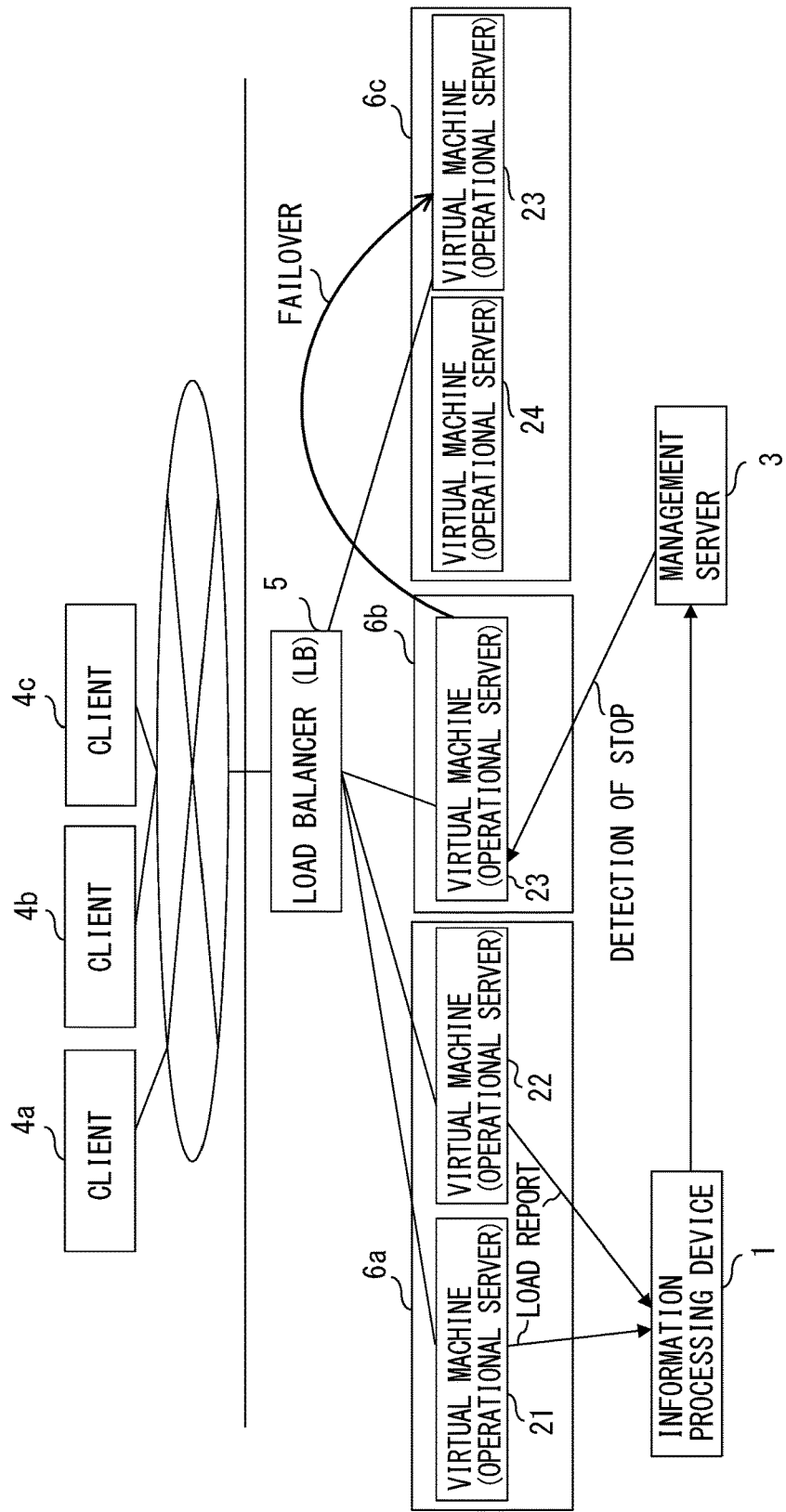
FIG. 1A is a block diagram illustrating the configuration of a processing distribution system including an information processing device according to each embodiment.
Figure 1B:
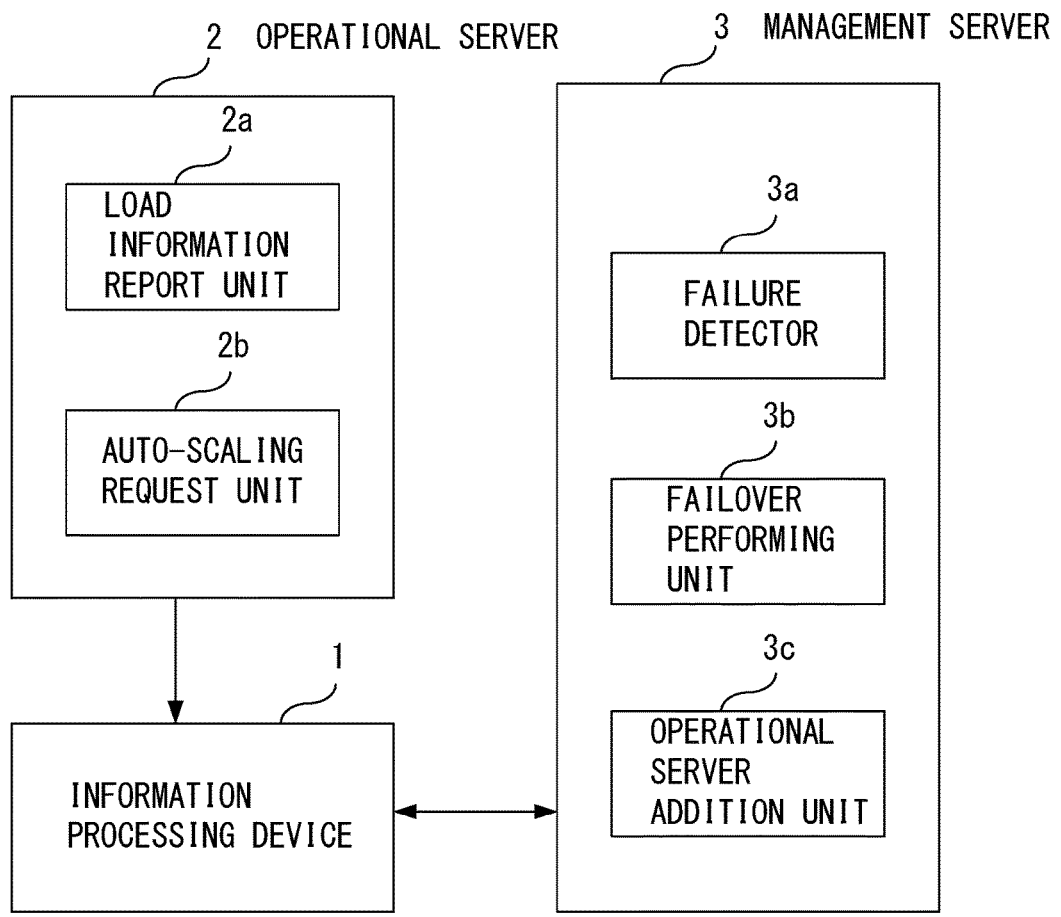
FIG. 1B illustrates the functional blocks of an operational server and a management server that are connected to an information processing device of a processing distribution system.

Embodiments are described below with reference to the drawings. FIG. 1A is a block diagram illustrating the configuration of a processing distribution system including an information processing device 1 according to a first embodiment. FIG. 1B illustrates the functional blocks of an operational server 2 and a management server 3 that are connected to the information processing device 1 of the processing distribution system.

The processing distribution system is configured by an information processing device (also referred to as a monitoring server) 1, operational servers 2 (21, 22, 23, and 24), a management server 3, clients 4 (4*a*, 4*b*, and 4*c*), a load balancer 5, and VM hosts 6 (6*a*, 6*b*, and 6*c*) in which the operational server 2 is arranged, as illustrated in FIG. 1A. The number of operational servers, the number of clients, and the number of VM hosts are not limited to the numbers above. The client 4 transmits a request for desired processing (also referred to as an operation) to the operational server 2, and receives a result of the processing performed according to the request from the operational server 2. At this time, the load balancer 5 distributes the request from the client 4 to the respective operational servers 2 such that a load is impartially imposed on each of the operational servers 2. By doing this, the resources of the processing distribution system are efficiently utilized.

The information processing device 1 according to the first embodiment will be described later in detail.

The operational server 2 processes a request from the client 4. The operational server 2 is arranged within the VM host 6, and includes a load information report unit 2*a* and an auto-scaling request unit 2*b*, as illustrated in FIG. 1B. The load information report unit 2*a* transmits, to the information processing device 1, a load report including load information of the operational server 2, as illustrated in FIG. 1A. At this time, the load information report unit 2*a* makes the load report include identification information for identifying the operational server 2. The auto-scaling request unit 2*b* transmits, to the information processing device 1, an auto-scaling request for generating an additional operational server 2, when a load on the operational server 2 has exceeded a specified load.

The flow of processing for transmitting a load report and an auto-scaling request performed by the operational server 2 is described with reference to FIG. 2. The load information report unit 2*a* determines whether a specified time period has passed (step S201). When the specified time period has passed (Yes in step S201), the load information report unit 2*a* transmits a load report to the information processing device 1 (step S202). When the specified time period has not passed (No in step S201), the processing returns to step S201. The auto-scaling request unit 2*b* determines whether a load on the operational server 2 has exceeded a specified load (step S203). When the load on the operational server 2 has exceeded the specified load (Yes in step S203), the auto-scaling request unit 2*b* transmits an auto-scaling request to the information processing device 1 (step S204). When the load on the operational server 2 has not exceeded the specified load (No in step S203), the processing returns to step S201.

When the management server 3 detects that the operational server 2 has been stopped (has gone down), the management server 3 performs failover and generates an additional operational server in accordance with a request to generate an additional operational server from the information processing device 1, as illustrated in FIG. 1A. Failover means that, when an operational server goes down, the operational server that has gone down is restarted in another VM host. Stated another way, performing failover means that, when the management server 3 detects that an operational server has gone down, the management server 3 restores and restarts the operational server that has gone down within another VM host.

The management server 3 includes a failure detector 3*a*, a failover performing unit 3*b*, and an operational server addition unit 3*c*, as illustrated in FIG. 1B. The failure detector 3*a* monitors the operational server 2. As an example, when the operational server 2 has stopped due to the excess of a limit of a processing load on the operational server 2, the failure detector 3*a* detects the stop of the operational server 2. The failover performing unit 3*b* conducts a failover test according to a request for the failover test from the information processing device 1, or performs failover as a result of the detection of the failure of the operational server 2. The failover test refers to a failover that is intentionally performed in order to measure in advance a time period after failover is started and before failover is finished, namely, a failover time. The operational server addition unit 3*c* generates an additional operational server according to a request to generate an additional operational server from the information processing device 1.

The information processing device 1 according to the first embodiment is described next with reference to FIG. 3A. FIG. 3A is a functional block diagram of the information processing device 1 according to the first embodiment.

The information processing device 1 according to the first embodiment is an information processing device that measures in advance a failover time in consideration of a load on each of a plurality of operational servers and prevents auto-scaling from being activated within the measured failover time. Specifically, the information processing device 1 is an information processing device in which, when a condition under which a failover test is conducted is satisfied, an operational server determination unit 10 determines an operational sever on which failover can be performed in the failover test in accordance with the number of operational servers 2 and a load on each of the operational servers 2, and a measurement request unit 11 issues, to the management server 3, a request to measure a failover time of the failover test conducted on the determined operational server. By doing this, a useless operational server is not generated, and therefore resources can be efficiently utilized. The operational server on which failover can be performed refers to an operational server that can be brought down in a failover test.

Figure 3B:
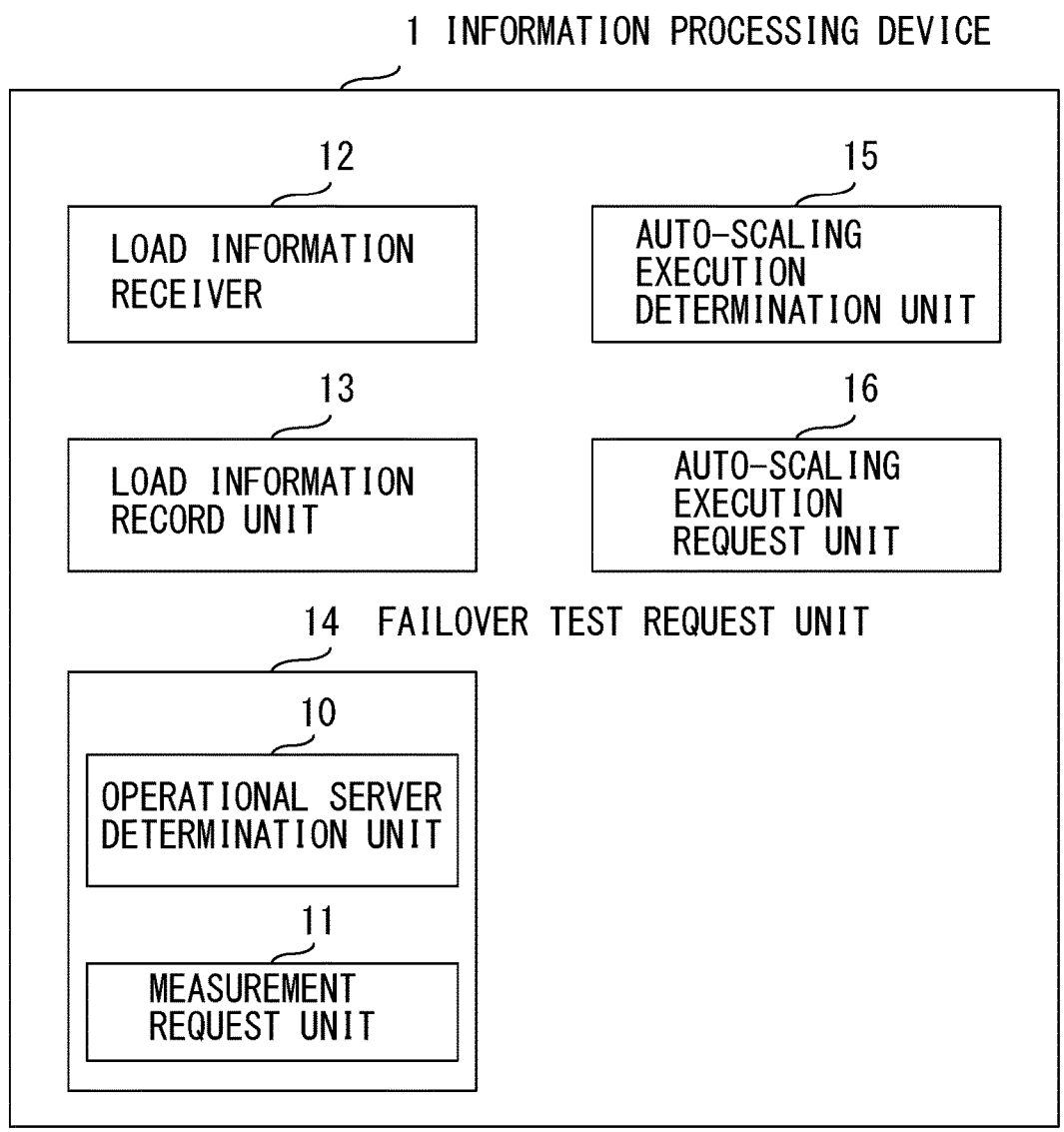

The information processing device 1 according to the first embodiment further includes other components, and the configuration of the information processing device 1 including the other components is illustrated in FIG. 3B.

The information processing device 1 according to the first embodiment includes a load information receiver 12, a load information record unit 13, a failover test request unit 14, an auto-scaling execution determination unit 15, and an auto-scaling execution request unit (also referred to as a postponement unit) 16. Processing performed by these functional blocks is, for example, processing in which a central processor unit (CPU) 111 executes a processing program stored in a hard disk drive (HDD) 112 or the like. The configuration of the information processing device 1 is not limited to the configuration above, and the information processing device 1 may have other components.

The load information receiver 12 receives a load report from an operational server 2. The load report includes load information indicating what operational load is imposed on the operational server 2, and identification information for identifying the operational server 2 that has transmitted the load report. By doing this, the operational server 2 that has transmitted the load report can be specified.

In addition, the load information receiver 12 receives, from an operational server 2, an auto-scaling request indicating a request to generate an additional operational server 2. The auto-scaling request includes identification information for identifying an operational server 2 that has transmitted the auto-scaling request. By doing this, the operational server 2 that has transmitted the auto-scaling request can be specified.

Further, the load information receiver 12 receives, from the management server 3, a measurement result of a failover test conducted by the management server 3. By doing this, information relating to a time period during which auto-scaling is postponed can be obtained.

The load information record unit 13 records the load information included in the received load report. Specifically, the load information record unit 13 records the name of an operational server and the load information (a load value) in the operational server load information table illustrated in FIG. 4 in accordance with the received load report. The operational server load information table is a table that records the load value of each of the operational servers and that records whether an auto-scaling report has been issued from the operational server 2 to the information processing device 1.

Upon receipt of the load report including the load information (for example, information indicating that 70% of an allowable load is imposed) from an operational server named server 1, the load information record unit 13 records server 1 as the name of an operational server, and records the information of 70% in a corresponding field indicating the load value as illustrated in FIG. 4. Also, when the load information record unit 13 receives a load report from another operational server 2, similar information is recorded.

In addition, when the load information receiver 12 receives an auto-scaling request from the operational server 2, the load information record unit 13 records information in the fields "auto-scaling report" and "auto-scaling request acceptance time" in the operational server load information table illustrated in FIG. 4. As an example, upon receipt of an auto-scaling request from an operational server named server 2 at 12:10:00, the load information record unit 13 records "on" in the field "auto-scaling report" in an entry for which the name of an operational server is server 2, and records "12:10:00" in the field "auto-scaling request acceptance time". When no auto-scaling requests have been received, the field "auto-scaling report" remains "off", and the field "auto-scaling request acceptance time" remains "0".

Further, the load information record unit 13 records a measurement result of a failover test according to a failover test request issued from the failover test request unit 14 to the management server 3 in the failover test information table illustrated in FIG. 5. The failover test information table includes the fields "failover test start time", "failover test end time", "current number of operational servers", and "number of previous-failover-test conducted servers". The failover test start time is the time when the failover test is started, and the failover test end time is the time when the failover test is finished. The current number of operational servers is the number of operational servers that exist in a distribution processing system at a point in time at which the failover test is started, and the number of previous-failover-test conducted servers is the number of operational servers that have been brought down in a previous failover test, namely, the number of operational servers on which failover has been performed.

The failover test request unit 14 includes an operational server determination unit 10 and a measurement request unit 11, and when the measurement request unit 11 determines that a condition under which the failover test is conducted is satisfied, the measurement request unit 11 transmits, to the management server 3, a failover test request to measure the failover time. The condition under which the failover test is conducted is described below.

Even if a failover test is conducted when the environment does not change after a previous failover test, it is not expected that the accuracy of the failover time be improved. Accordingly, the failover test request is issued, for example, when at least one of the two conditions described below is satisfied. Conduction conditions are not limited to the two conditions, and other conditions may be added.

A first condition is that the number of operational servers 2 changes after a previous failover test. Specifically, the first condition is that a value of the current number of operational servers in the most recent entry of the failover test information table illustrated in FIG. 5 is different from the number of operational servers that exist when the failover test is about to be conducted. This is because a change in the number of operational servers can be regarded as a change in the volume of operations.

A second condition is that a long time, for example, five days, has passed after a previous failover test. Specifically, the second condition is that a specified time period has passed after a time that is recorded in the field "failover test end time" in the most recent entry of the failover test information table illustrated in FIG. 5. This is because the surrounding environment may change even if the number of operational servers does not change.

When the conditions above are satisfied but the number of operational servers to be brought down that is determined when issuing a failover test request is zero, the measurement request unit 11 does not transmit the failover test request to the management server 3.

Here, a method for determining the number of operational servers to be brought down in a failover test when issuing a failover test request is described.

An operational server that will be brought down (an operational server on which failover will be performed) is determined in order to conduct a failover test for measuring in advance the time needed for failover. When conducting the failover test, when a larger number of operational servers are simultaneously brought down, the accuracy of the measurement of the time needed for an actual failover is improved.

However, when a plurality of operational servers 2 are simultaneously brought down, a load on each existing operational server 2 excessively increases, and therefore an appropriate number of operational servers 2 need to be brought down. Accordingly, the number of operational servers is calculated in consideration of a rate of an increase in a load, and a failover test request is issued. A specific method for determining the number of operational servers is described below.

Assume, for example, that a rate of an increase in a load in a case in which auto-scaling is activated (an auto-scaling activation load) is 100%, and that a rate of an increase in a load in a case in which a failover test is activated (a failover execution load) is 80%. The failover execution load is calculated according to a CPU utilization, a value obtained by dividing the number of requests from the clients 4 by the number of acceptable requests, and the like.

In this case, the number of operational servers when a failover test is conducted is calculated by the operational server determination unit 10 according to the following expression.

Number of operational servers−{(operational server average load*number of operational servers)/ failover execution load}

The operational server average load is also calculated according to the load information received from the operational server 2 by the operational server determination unit 10.

Assume, for example, that the failover execution load is 80%, that the operational server average load is 60%, and that the number of operational servers is 5. When these values are applied to the expression above, the number of operational servers on which the failover test will be conducted is 1. Assume, for example, that the failover execution load is 80%, that the operational server average load is 40%, and that the number of operational servers is 8. When these values are applied to the expression above, the number of operational servers on which the failover test will be conducted is 4. In the two examples above, the number of operational servers on which the failover test will be conducted is greater than or equal to 1, but the number of operational servers may be 0. In this case, the measurement request unit 11 does not transmit the failover test request to the management server 3.

The number of operational servers to be brought down in the failover test is determined by using the method above, but the determination method is not limited to the method above, and the number of operational servers may be determined by using another method.

Return now to the description of the configuration of the information processing device 1. The auto-scaling execution determination unit 15 determines whether an auto-scaling request has been issued from an operational server 2. When the auto-scaling request has been issued, the auto-scaling execution determination unit 15 determines whether a specified condition is satisfied. The specified condition is that a time period (a duration time) between an auto-scaling request that was initially issued from an operational server 2 that issued a current auto-scaling request and the current auto-scaling request does not exceed a time α that has been measured in advance in the failover test.

When the auto-scaling execution determination unit 15 determines that the auto-scaling request has been issued and that the specified condition is not satisfied, namely, that the duration time exceeds time α, the auto-scaling execution request unit 16 issues an additional generation request to generate an additional operational server to the management server 3.

When the auto-scaling execution determination unit 15 determines that the specified condition is satisfied, namely, that the duration time does not exceed time α, the auto-scaling execution request unit 16 postpones transmitting, to the management server 3, a request to generate an additional operational server 2 by executing auto-scaling.

A processing flow including a failover test request of the information processing device 1 according to the first embodiment is described next with reference to FIG. 6. This processing is, for example, processing in which the CPU 111 executes a processing program stored in the HDD 112 or the like.

The load information receiver 12 receives a load report or an auto-scaling request from an operational server 2 (step S601). When the load information receiver 12 receives the load report, the load information record unit 13 records identification information of the operational server 2 included in the load report in the field "operational server name" in the operational server load information table, and also records load information included in the load report in the field "load value" (step S602).

The auto-scaling execution determination unit 15 determines whether an auto-scaling request has been issued from the operational server 2 (step S603). When the auto-scaling request has been issued (Yes in step S603), the auto-scaling execution request unit 16 determines whether the duration time is within time α, which has been measured in advance in the failover test (step S604). When the duration time is within time α (Yes in step S604), namely, when auto-scaling is postponed, the auto-scaling execution request unit 16 terminates the processing without issuing an auto-scaling request.

When the duration time exceeds time α (No in step S604), the auto-scaling execution request unit 16 transmits an auto-scaling request to the management server 3 in order to generate an additional operational server 2 by performing auto-scaling (step S605), and the auto-scaling execution request unit 16 terminates the processing.

When it is determined in step S603 that no auto-scaling requests have been issued (No in step S603), the failover test request unit 14 determines whether the number of operational servers at a current point in time is different from a value of a current number of operational servers in the failover test information table (step S606). When it is determined that they are the same as each other (No in step S606), the failover test request unit 14 determines whether a longtime (for example, 5 days) has passed after a time that is recorded in the field "failover test end time" in the most recent entry of the failover test information table (step S607). When a long time has not passed (No in step S607), namely, when the environment has not changed after the previous failover test, the failover test request unit 14 does not issue a failover test request, and it terminates the processing. When a long time has passed (Yes in step S607), the processing moves on to step S608. The processes of step S606 and step S607 may be performed in a reverse order.

When it is determined in step S606 that the number of operational servers at a current point in time has changed from a previous number (Yes in step S606), a new record field is generated in the failover test information table, and the number of operational servers at a current point in time is recorded in the field "current number of operational servers" (step S608).

The failover test request unit 14 calculates the number of operational servers to be brought down at the time when the failover testis conducted, and records the calculated number of operational servers in the field "number of previous-failover-test conducted servers" that corresponds to the current number of operational servers that has been newly recorded (step S609). An operational server average load used to calculate the number of operational servers to be brought down is also calculated by the failover test request unit 14 in step S609.

The failover test request unit 14 determines whether the calculated number of operational servers to be brought down is greater than 0 (step S610). When the number of operational servers to be brought down is 0 (No in step S610), the failover test fails to be conducted, and therefore the processing is terminated.

When the number of operational servers to be brought down is greater than 0 (Yes in step S610), the failover test request unit 14 records a start time of the failover test in the field "failover test start time" that corresponds to the current number of operational servers that has been newly recorded, and starts counting (step S611). The failover test request unit 14 transmits, to the management server 3, a request for the failover test, namely, a request to measure the failover time in the failover test, together with a request to stop the operational server 2 (step S612).

The failover test request unit 14 receives, from the management server 3, a result of the measurement of the failover time (time α) that has been performed by the management server 3 in accordance with the failover test request, and transmits, to the management server 3, a request to activate the operational server that has been brought down (step S613). The failover test request unit 14 stops counting the failover test time upon receipt of the measurement result, records the time when counting was stopped in the field "failover test end time" that corresponds to the failover test start time (step S614), and terminates the processing.

Figure 7:
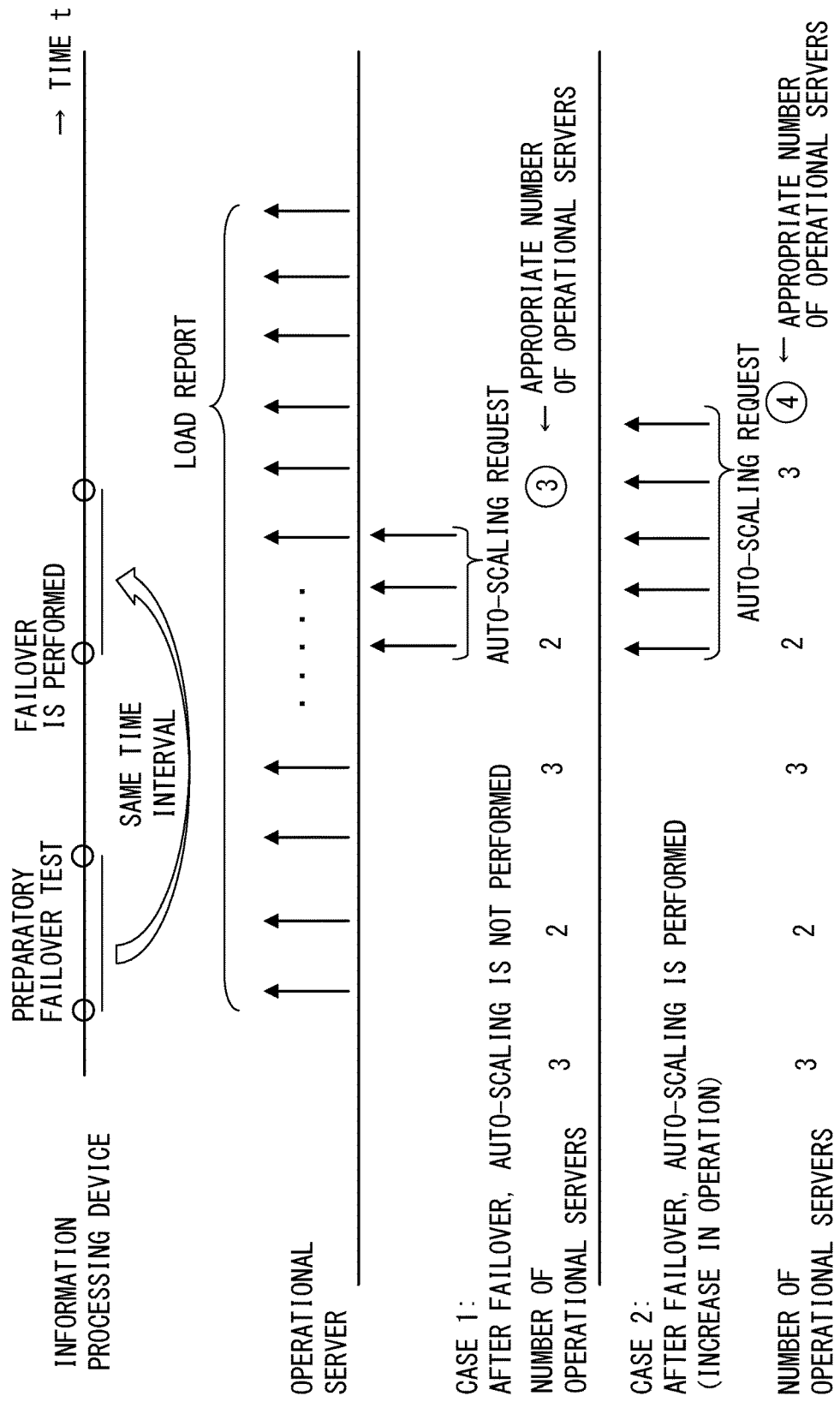
FIG. 7 is a diagram explaining a case in which auto-scaling is not performed after failover is finished and a case in which auto-scaling is performed.

A case in which auto-scaling is not performed after failover is terminated and a case in which auto-scaling is performed are described next with reference to FIG. 7. Assume that a failover time that is measured when the management server 3 conducts the failover test is time α. Also assume that the number of operational servers at a point in time when the failover test is started is 3, and that the number of operational servers to be brought down at the time when the failover test is conducted is 1. Stated another way, during a period when the failover test is being conducted, two operational servers 2 are operating. When the failover test is finished, the operational server that has been brought down is started, and the three operational servers before the failover test operate after the failover test has been finished.

A case (case 1) in which auto-scaling is not performed after failover has been finished in this situation is described. The information processing device 1 postpones performing auto-scaling even when the information processing device 1 receives the auto-scaling request within failover time α, which has been measured in advance. After failover time α has passed, the information processing device 1 does not receive an auto-scaling request from the operational server 2, and therefore the information processing device 1 determines that operational processing will be able to be performed by using the three operational servers before failover. Accordingly, auto-scaling does not need to be performed after failover has been finished, and an appropriate number of operational servers is 3, which is the number of operational servers before failover.

A case (case 2) in which auto-scaling is performed after failover has been finished is described. The information processing device 1 postpones performing auto-scaling even when the information processing device 1 receives the auto-scaling request within failover time α, which has been measured in advance, similar to case 1. However, the information processing device 1 receives the auto-scaling request from the operational server 2 also after failover time α has passed, and therefore the information processing device 1 determines that operational processing will fail to be performed by using the three operational servers before failover. Accordingly, auto-scaling needs to be performed after failover has been finished, and the information processing device 1 transmits, to the management server 3, a request to add another operational server to the three operational servers before failover. By doing this, another operational server is added, and an appropriate number of operational servers is 4.

An information processing device according to a second embodiment is described next. An information processing device 80 according to the second embodiment includes components that are similar to those in the information processing device 1 according to the first embodiment, and further includes a determination unit 17 and a calculator 18, as illustrated in FIG. 8.

In the information processing device 80 according to the second embodiment, the determination unit 17 determines the number of operational servers that have gone down during failover, and the calculator 18 calculates a failover time according to the determined value. Specifically, the calculator 18 in the information processing device 80 according to the second embodiment calculates a failover time by using the number of operational servers that have gone down and the extended failover test information table illustrated in FIG. 9 in which the failover test information table illustrated in FIG. 5 is extended. Within the calculated failover time, the auto-scaling execution request unit 16 postpones performing auto-scaling.

The extended failover test information table is described with reference to FIG. 9. The extended failover test information table is a table obtained by adding the field "failover time per VM" to the contents of the failover test information table illustrated in FIG. 5. The contents of the table illustrated in FIG. 5 are included in the table illustrated in FIG. 9, and therefore these tables may be combined into a single table.

As an example, in a failover test for which a failover test start time is 11:00:00, a failover test end time is 11:10:00, and therefore a difference between these failover times is 10:00. In this failover test, the number of operational servers that have been brought down in order to conduct the failover test (the number of previous-failover-test conducted servers) is 1. Accordingly, a failover time per VM is obtained by dividing the failover time 10:00 by 1, which is the previous failover test conducted server number, and the obtained failover time per VM is 10:00.

As another example, in a failover test for which a failover test start time is 14:00:00, a failover test end time is 14:25:00, and therefore a difference between these failover times is 25:00. In this failover test, the number of operational servers that have been brought down in order to conduct the failover test (the number of previous-failover-test conducted servers) is 5. Accordingly, a failover time per VM is obtained by dividing the failover time 25:00 by 5, which is the number of previous-failover-test conducted servers, and the obtained failover time per VM is 5:00.

The calculation of a failover time using the extended failover test information table that is performed by the information processing device 80 according to the second embodiment is described in detail. The information processing device 80 according to the second embodiment determines the number of operational servers that have gone down during failover, and compares the determined number with respective values of the number of previous-failover-test conducted servers in the extended failover test information table.

As a result of comparison, when a value exists that matches the number (for example, 2) of operational servers that have gone down during failover, a failover time of a corresponding failover test is used. In this example, a result of a failover test in the second row from the top of the extended failover test information table can be used, and therefore the failover time is 16:00.

As a result of comparison, in some cases a value does not exist that matches the number (for example, 4) of operational servers that have gone down during failover, but the number of operational servers that have gone down is within a range of the number of previous-failover-test conducted servers (in this example of the table, a range of 1 to 5). In these cases, an average value of the failover times of the failover tests is used. In this example, the number of operational servers that have gone down is 4, but the only results of failover tests that exist respectively indicate that the numbers of previous-failover-test conducted servers are 3 and 5. Therefore, an average of the failover time 7:00 per VM in the case of 3 operational servers and the failover time 5:00 per VM in the case of 5 operational servers is calculated. The calculated average value is 6:00. This average value is multiplied by 4, which is the number of operational servers that have gone down, and the obtained value 24:00 is specified to be the failover time.

As a result of comparison, in some cases, a value does not exist that matches the number (for example, 6) of operational servers that have gone down during failover, and the number of operational servers that have gone down is not within a range of the number of previous-failover-test conducted servers (in this example of the table, a range of 1 to 5). In these cases, calculation is performed according to the maximum value of the failover times of the failover tests. In this example, the number of operational servers that have gone down is 6, but the maximum value of the numbers of previous-failover-test conducted servers is 5. Therefore, the number of operational servers that have gone down is not within the range. Accordingly, a result of a failover test for which the failover time is the greatest, namely, 5:00, which is a failover time per VM in a case in which the number of previous-failover-test conducted servers is 5, is used. In this case, the failover time 5:00 is multiplied by 6, which is the number of operational servers that have gone down, and the obtained value 30:00 is specified to be the failover time.

Figure 10:
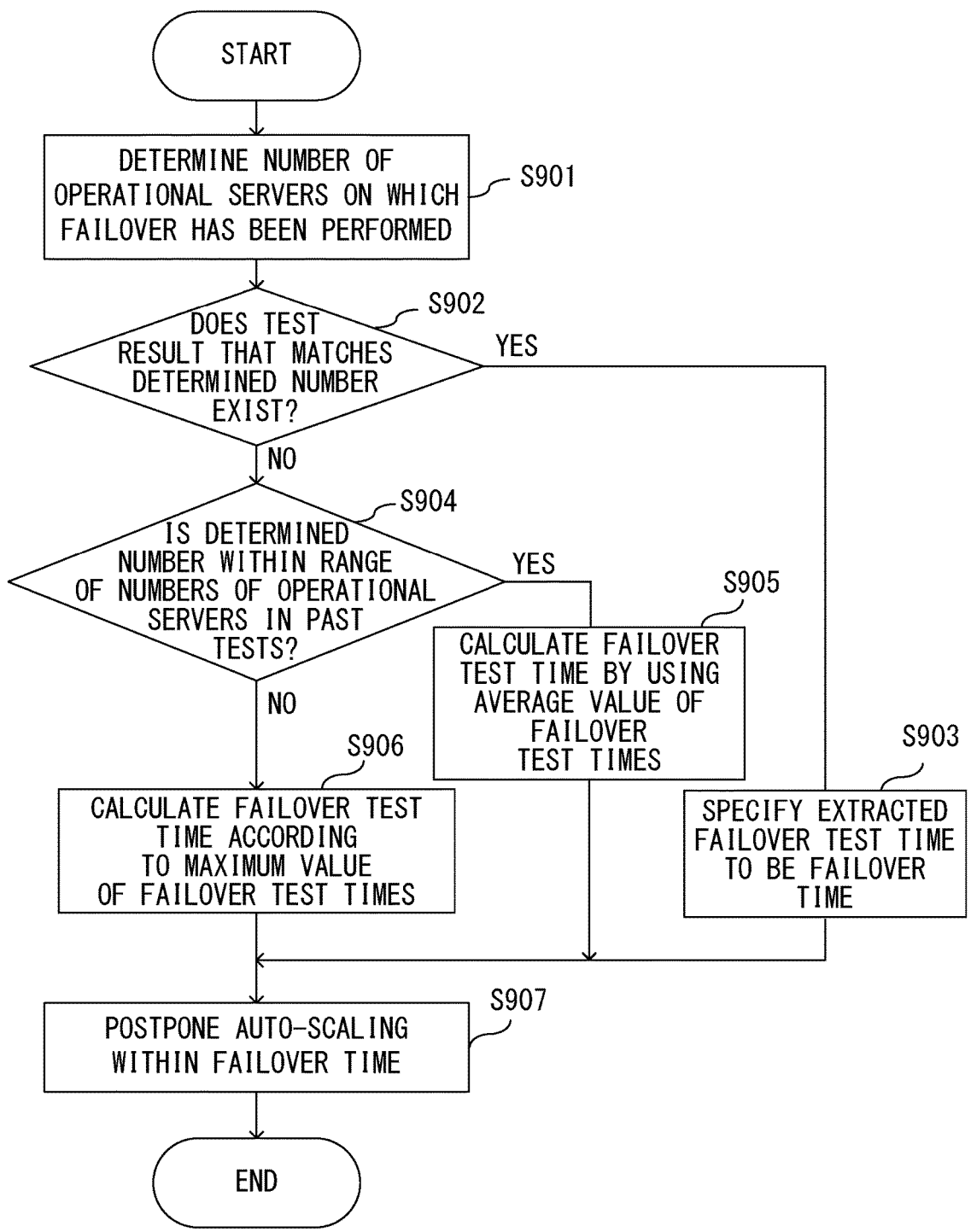
FIG. 10 is a flowchart illustrating processing for calculating a failover time at the time when auto-scaling is postponed in the information processing device according to the second embodiment.

A processing flow of the calculation of a failover time during which auto-scaling is postponed in the information processing device 80 according to the second embodiment is described next with reference to FIG. 10. This processing is, for example, processing in which the CPU 111 executes a processing program stored in the HDD 112 or the like.

When the activation of failover is recognized by the management server 3, the failover test request unit 14 determines the number of operational servers on which failover has been performed, namely, the number of operational servers that have gone down (step S1001). The failover test request unit 14 determines whether the number of failover-test conducted servers that matches the determined number of operational servers exists in the results of failover tests that have been performed in the past (step S1002). When a result of a failover test that matches the determined number exists (Yes in step S1002), the failover test request unit 14 extracts a failover test time of the matching failover test result, and specifies the extracted failover test time to be the failover time (step S1003).

When no matching failover test results exist (No in step S1002), the failover test request unit 14 determines whether the determined number of operational servers is within a range of the numbers of failover-test conducted servers of failover tests that have been conducted in past (step S1004). When the determined number of operational servers is within the range (Yes in step S1004), the failover test request unit 14 calculates an average value by using the failover test times of test results within the range, and calculates the failover time by using the calculated average value (step S1005).

When the determined number of operational servers is not within the range (No in step S1004), the failover test request unit 14 calculates the failover time in accordance with the maximum value of the failover test times (step S1006). The failover test request unit 14 postpones (cancels) the activation of auto-scaling within the calculated failover time (step S1007).

Figure 11:
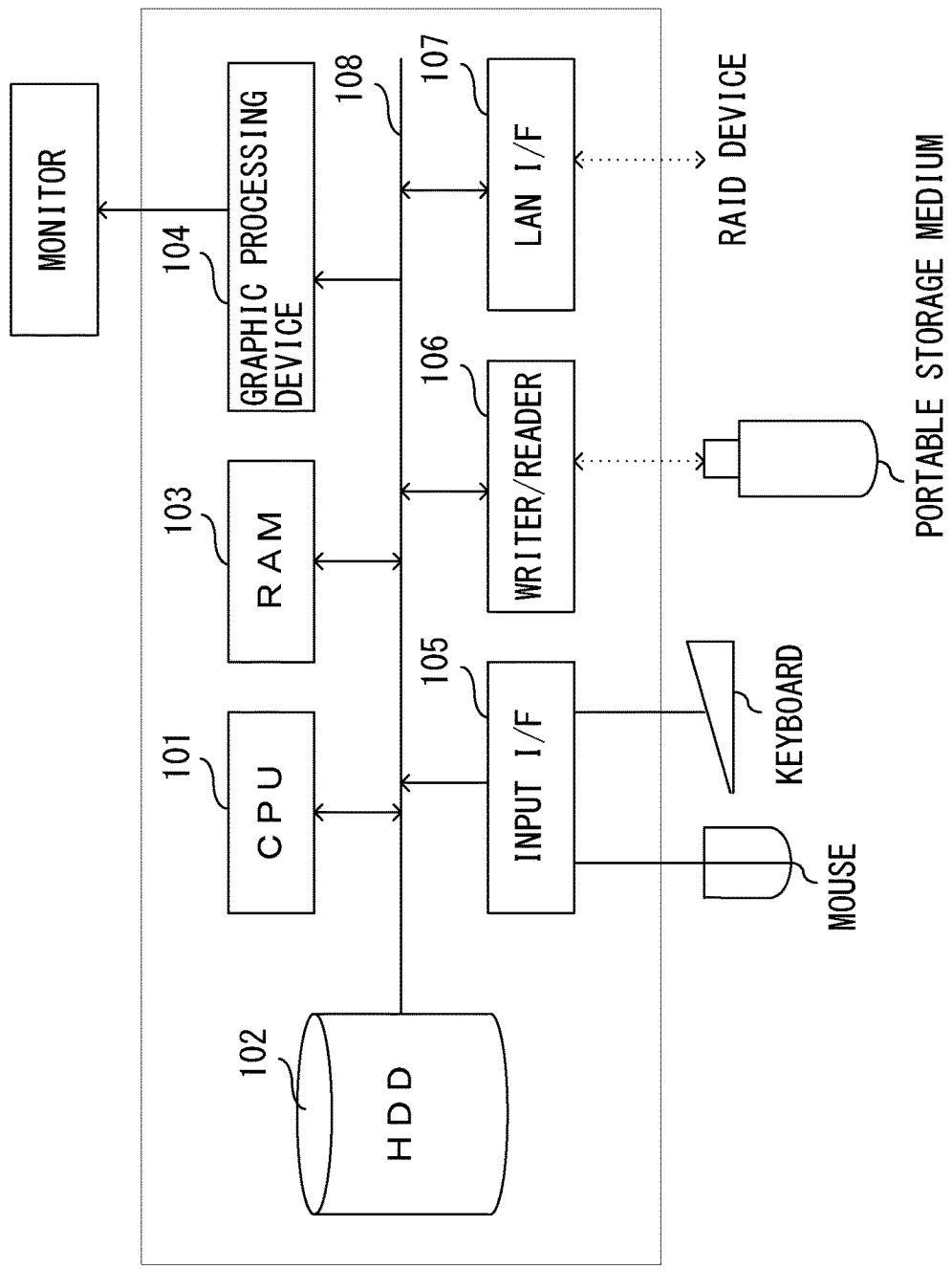
FIG. 11 illustrates an example of a hardware configuration that implements an information processing device according to each of the embodiments.

An example of a hardware configuration that implements an information processing device according to each of the embodiments is described next with reference to FIG. 11.

The hardware configuration includes, for example, a CPU 111, an HDD 112, a random access memory (RAM) 113, a graphic processing device 114, an input interface (I/F) 115, a writer/reader 116, a LAN I/F 117, and a bus 118. The CPU 111, the HDD 112, the RAM 113, the graphic processing device 114, the input I/F 115, the writer/reader 116, and the LAN I/F 117 are connected to each other via the bus 118.

The CPU 111 reads, via the bus 118, a program (for example, an information processing program) for performing various types of processing of the information processing device that are stored, for example, in the HDD 112. The CPU 111 transitorily stores the read program in the RAM 113, and performs various types of processing according to the program.

In the HDD 112, an application program for performing various types of processing of the information processing device, data needed for the processing of the information processing device, and the like are stored.

The RAM 113 is a volatile memory, and a portion of an operating system (OS) program and the application program to be executed by the CPU 111 is temporarily stored in the RAM 113. In addition, various types of data needed for processing performed by the CPU 111 are stored in the RAM 113.

The graphic processing device 114 is connectable to a monitor or the like, and the graphic processing device 114 generates information to be displayed on the monitor.

The input I/F 115 receives information that is input via a mouse, a keyboard, or the like.

The writer/reader 116 writes information to a portable storage medium such as a universal serial bus (USB) memory, or reads information from the portable storage medium.

The LAN I/F 117 transmits or receives data to/from the outside (such as a redundant array of inexpensive disks (RAID) device) via a network.

The bus 118 is a route that mediates communication of a control signal, a data signal, and the like between respective devices.

In the embodiments above, principal processes of the information processing device are performed by performing software processing using the CPU, but all or some of these processes may be implemented by hardware.

As described above, in the embodiments above, a problem in the processing distribution system described in Japanese Laid-open Patent Publication No. 2016-058005 in which the auto-scaling technology and the automatic failover technology are combined can be solved. Namely, a problem can be solved wherein the activation of auto-scaling may be performed simultaneously with the activation of automatic failover such that operational servers become useless, and such that resources are uselessly utilized or a process for stopping the useless operational servers is performed.

The auto-scaling technology is described. As illustrated in FIG. 12, in an operational model, a load balancer 200 receives requests from a plurality of clients (for example, clients 1 to 3). The load balancer 200, which has received the requests, distributes requests to be processed to a plurality of operational servers in such a way that a load on an operational server 203 (203a, 203b, and 203c) that operates on a virtual machine 202 (202a, 202b, and 202c) within a virtual machine (VM) host 201 (201a and 201b) does not increase. The virtual machine 202 is a concept managed by a management server 205, and the operational server 203 is a target monitored by a monitoring server 204.

In some cases, client n−1 and client n are newly added to the operational model, the number of requests increases, and a load on the operational server 203 increases even when the load balancer 200 distributes the requests. In these cases, the operational servers 203a to 203c transmit an overload report indicating an overload to the monitoring server 204. The monitoring server 204, which has received the overload report, issues, to the management server 205, a request to add an operational server. The management server 205 adds a new operational server within the VM host 201 (for example, the VM host 201b) in accordance with the request. A technology for adding a new operational server according to a load, as described above, is the auto-scaling technology. By doing this, a load on an operational server is distributed, and the load on the operational server can be reduced.

Figure 13:
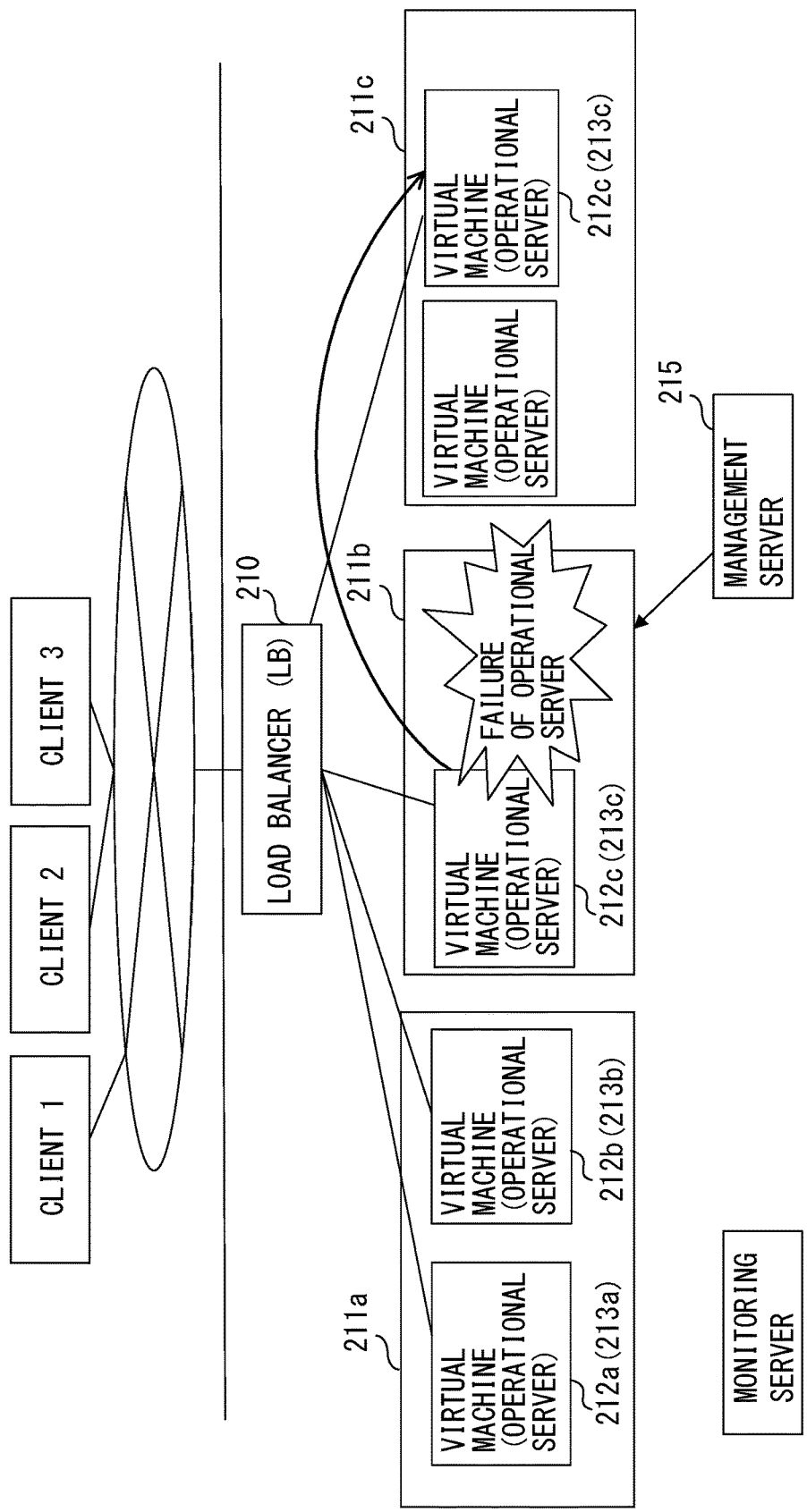
FIG. 13 is a diagram explaining the automatic failover technology.

The automatic failover technology is described. As illustrated in FIG. 13, in an operational model, a load balancer 210 receives requests from a plurality of clients (for example, clients 1 to 3). The load balancer 210, which has received the requests, distributes requests to be processed to a plurality of operational servers in such a way that a load on an operational server 213 that operates on a virtual machine 212 within a VM host 211 does not increase.

However, as an example, when an operational server 213c that operates on a virtual machine 212c within a VM host 211b goes down, the load balancer 210 fails to perform communication with the operational server 213c. When the operational server 213c goes down, a management server 215 restarts the operational server 213c that has gone down, for example, within a VM host 211c. As described above, a technology for restarting an operational server that has gone down within another VM host when the operational server goes down is the automatic failover technology. By doing this, even when an operational server goes down, a load on operational servers can be distributed.

Figure 14:
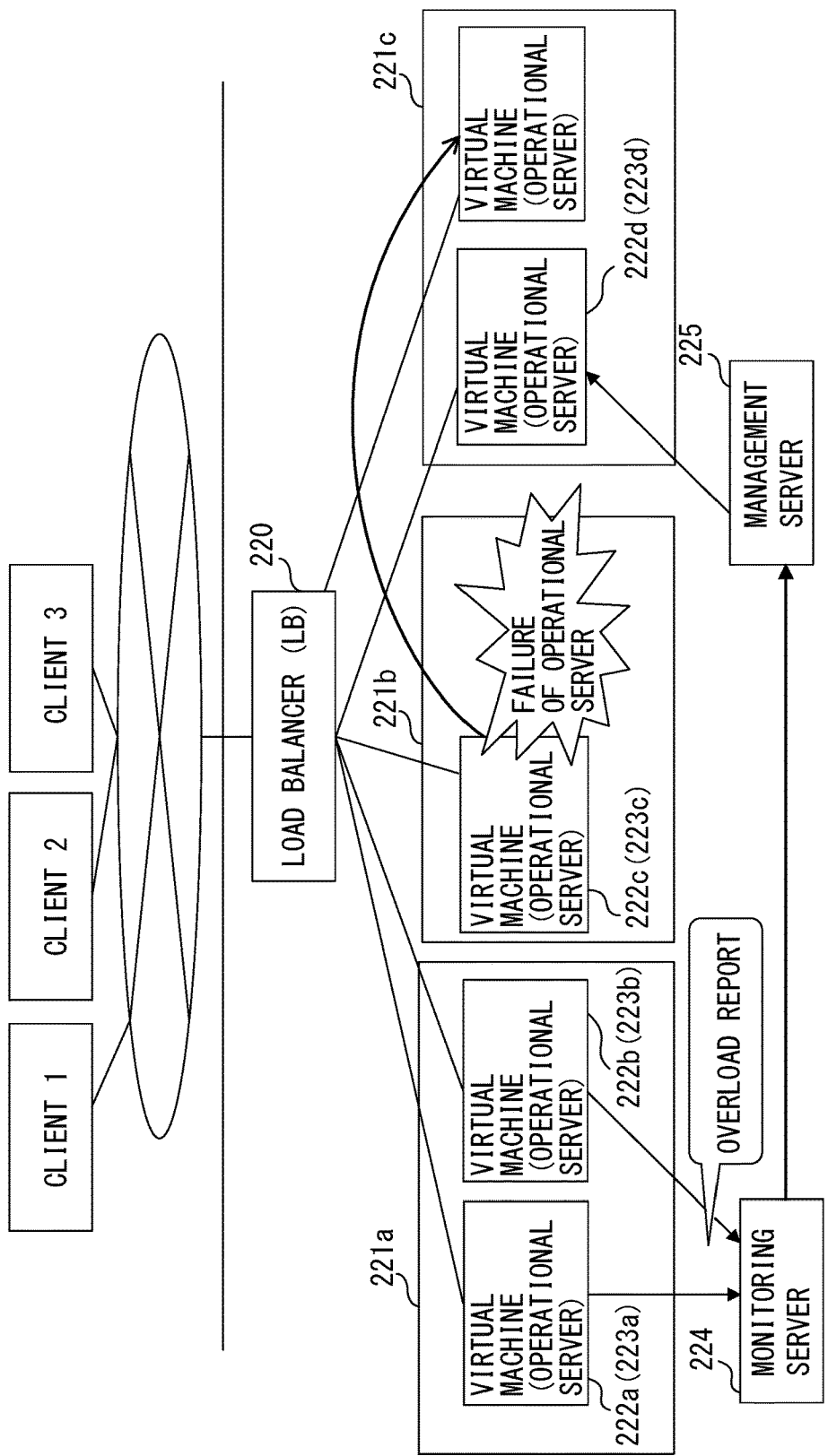
FIG. 14 illustrates a processing distribution system in which respective technologies are combined.

A processing distribution system is described in which the respective technologies above are combined. In this case, auto-scaling and automatic failover may be performed simultaneously. As illustrated in FIG. 14, in an operational model, as an example, when an operational server 223c goes down, a load balancer 220 fails to perform communication with the operational server 223c. Due to the failure of the operational server 223c, a load on each of the other operational servers increases. A larger load is imposed on an operational server 223a and an operational server 223b, and the operational server 223a and the operational server 223b transmit an overload report to a monitoring server 224. The monitoring server 224, which has received the overload reports, issues, to a management server 225, a request to add an operational server. The management server 225 adds a new operational server 223d to a VM host 221c in accordance with the request.

Meanwhile, due to the failure of the operational server 223c, the load balancer 220 fails to perform communication with the operational server 223c. Therefore, the management server 225 restarts the operational server 223c within the VM host 221c when the operational server 223c goes down.

In one aspect of the information processing device according to each of the embodiments, auto-scaling that enables the autonomous operation of operational servers according to a change in the volume of operations and failover that enables the reliable operation of operational servers can be applied simultaneously. In addition, unrequested auto-scaling can be suppressed, and therefore a reduction in an operation cost such as the monthly subscription of a cloud can be achieved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing device that monitors a plurality of operational servers to which processing is allocated, the information processing device comprising:
   a processor configured to:
      determine an operational server on which failover will be performed in a failover test from among the plurality of operational servers in accordance with a number of the plurality of operational servers and a load, when a condition under which the failover test is conducted is satisfied,
      issue a request to measure a failover time of the failover test that is conducted on the determined operational server, and
      when the operational server stops, postpone auto-scaling processing within the measured failover time.

2. The information processing device according to claim 1, wherein
   the processor determines a number of operational servers in which a failure has occurred, when automatic failover is activated,
   the processor calculates the failover time during which the auto-scaling processing is postponed in accordance with the determined number of operational servers and the failover time of the failover test, and
   the processor postpones the auto-scaling processing within the calculated failover time.

3. The information processing device according to claim 1, wherein
   the condition under which the failover test is conducted is a condition that the number of operational servers has changed after a previous failover test, a condition that a specified time period has passed after the previous failover test, or both thereof.

4. A failover time measurement method performed by an information processing device that monitors a plurality of operational servers to which processing is allocated by using a computer, the failover time measurement method comprising:
   determining an operational server on which failover will be performed in a failover test from among the plurality of operational servers in accordance with a number of the plurality of operational servers and a load, when a condition under which the failover test is conducted is satisfied;
   issuing a request to measure a failover time of the failover test that is conducted on the determined operational server; and
   when the operational server stops, postponing auto-scaling processing within the measured failover time.

5. A non-transitory computer-readable recording medium having stored therein a failover time measurement program for causing an information processing device to execute a process, the information processing device monitoring a plurality of operational servers to which processing is allocated, the process comprising:

determining an operational server on which failover will be performed in a failover test from among the plurality of operational servers in accordance with a number of the plurality of operational servers and a load, when a condition under which the failover test is conducted is satisfied;

issuing a request to measure a failover time of the failover test that is conducted on the determined operational server; and when the operational server stops, postponing auto-scaling processing within the measured failover time.

* * * * *